(12) United States Patent
Bangalore et al.

(10) Patent No.: US 8,190,436 B2
(45) Date of Patent: May 29, 2012

(54) SYSTEM AND METHOD OF SPOKEN LANGUAGE UNDERSTANDING IN HUMAN COMPUTER DIALOGS

(75) Inventors: Srinivas Bangalore, Morristown, NJ (US); Narendra K. Gupta, Dayton, NJ (US); Mazin G Rahim, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1986 days.

(21) Appl. No.: 10/310,596

(22) Filed: Dec. 5, 2002

(65) Prior Publication Data

US 2003/0130841 A1 Jul. 10, 2003

Related U.S. Application Data

(60) Provisional application No. 60/338,202, filed on Dec. 7, 2001.

(51) Int. Cl.
*G10L 21/00* (2006.01)
*G06F 17/20* (2006.01)
*G06F 17/27* (2006.01)

(52) U.S. Cl. .............................. 704/270.1; 704/1; 704/9

(58) Field of Classification Search ........................ None
See application file for complete search history.

(56) References Cited

U.S. PATENT DOCUMENTS

| 4,887,212 A | * | 12/1989 | Zamora et al. | 704/8 |
| 5,390,279 A | * | 2/1995 | Strong | 704/200 |
| 5,479,563 A | * | 12/1995 | Yamaguchi | 704/232 |
| 6,330,539 B1 | * | 12/2001 | Takayama et al. | 704/275 |
| 6,539,348 B1 | * | 3/2003 | Bond et al. | 704/9 |
| 6,647,363 B2 | * | 11/2003 | Claassen | 704/1 |
| 6,810,375 B1 | * | 10/2004 | Ejerhed | 704/9 |
| 6,829,603 B1 | * | 12/2004 | Wolf et al. | 1/1 |

OTHER PUBLICATIONS

Traum et al. "Conversation Acts in Task-Oriented Spoken Dialogue". Computational Intelligence, Special Issue: Computational Approaches to Non-Literal Language, vol. 8 No. 3, Aug. 1992.*
Bunt, Harry. "Iterative Context Specification and Dialogue Analysis". In H.C. Bunt & W. J. Black (Eds.), Abduction, Belief, and Context: Studies in Computational Pragmatics, pp. 73-129. London: University College Press, 1998.*

* cited by examiner

*Primary Examiner* — Talivaldis Ivars Smits
*Assistant Examiner* — Jesse Pullias

(57) ABSTRACT

A system and method are disclosed that improve automatic speech recognition in a spoken dialog system. The method comprises partitioning speech recognizer output into self-contained clauses, identifying a dialog act in each of the self-contained clauses, qualifying dialog acts by identifying a current domain object and/or a current domain action, and determining whether further qualification is possible for the current domain object and/or current domain action. If further qualification is possible, then the method comprises identifying another domain action and/or another domain object associated with the current domain object and/or current domain action, reassigning the another domain action and/or another domain object as the current domain action and/or current domain object and then recursively qualifying the new current domain action and/or current object. This process continues until nothing is left to qualify.

14 Claims, 4 Drawing Sheets

SYSTEM AND METHOD OF SPOKEN LANGUAGE UNDERSTANDING IN HUMAN COMPUTER DIALOGS

RELATED APPLICATIONS

Priority Application

The present application claims priority to Provisional Patent Application No. 60/338,202 filed Dec. 7, 2001, the contents of which are incorporated by reference.

BACKGROUND OF THE INVENTION

1. Field of the Invention

The present invention relates to spoken language understanding in human computer dialogs and more specifically to a system and method of improving spoken language understanding in view of grammatically incorrect utterances and unpredictable error in the input to speech recognition modules.

2. Discussion of Related Art

The present invention relates to spoken dialog systems. Such systems typically contain well-known modules for engaging in a human-computer dialog. The modules include an automatic speech recognition module, a spoken language understanding module, a dialog management module, and a text-to-speech module. The process requires each one of these modules to process data and transmit output to the next module for recognizing speech from a person, understanding the meaning of the speech, formulating a response, and generating synthetic speech to "respond" to the person.

FIG. 1 shows the architecture of a typical spoken dialog system 100. In this architecture, speech is recognized by the speech recognition module 102 and an information extractor 104 processes the recognized text and identifies the named entities e.g. phone numbers, time, monetary amounts, in the input. After substituting a suitable symbol for the named entities the information extractor 104 passes the recognized text on to the spoken language understanding unit (SLU) 106. The SLU 106 processes this input and generates a semantic representation, i.e. transforms it into another language that can be understood by a computer program; usually called a dialog manager (DM) 108. The DM 108 is typically equipped with an interpreter 110 and a problem solver 112 to determine and generate a response to the user. The information generated by the DM 108 is transmitted to a TTS module 114 for generating synthetic speech to provide the response of the system to the user 116. Information regarding the general operation of each of these components is well known to those of skill in the art and therefore only a brief introduction is provided herein.

The present disclosure relates to the spoken language understanding module. This module receives output from the automatic speech recognition module in the form of a stream of text that represents, to the best of the systems ability, what the user has said. The next step in the dialog process is to "understand" what the user has said, which is the task of the spoken language understanding unit. Accomplishing the task of recognizing speech spoken by a person and understanding the speech through natural language understanding is a difficult task. The process increases in complexity due to several factors. First, human interactions through speech seldom contain grammatically correct utterances. Therefore, the text output transmitted to the spoken language understanding module from the recognition module will not always contain coherent sentences or statements. Second, speech recognition software introduces unpredictable error in the input. Because of these reasons, semantic analysis based on syntactic structures of the language is bound to fail.

One known attempt to achieve spoken language understanding is to apply a classifier to classify the input directly in one of the limited number of actions the dialog system can take. Such techniques work well when there are small number of classes to deal with, e.g. in call routing systems. However, these approaches do not scale well for tasks that require very large number of classes, e.g. problem-solving tasks, because it is humanly impossible to consistently label the very large amount of data that would be needed to train such a classifier.

What is needed is an improved method of processing the data to increase the accuracy of the spoken language understanding module and that is scalable to enable a general application of the spoken language understanding module beyond a specific domain.

SUMMARY OF THE INVENTION

The above deficiencies are addressed by the invention disclosed herein. Aspects of the invention include a system and a method of improving speech understanding in a spoken dialog system. As an exemplary embodiment, the method comprises partitioning speech recognizer output into self-contained clauses, identifying a dialog act in each of the self-contained clauses, qualifying dialog acts by identifying a current domain object and/or a current domain action, and determining whether further qualification is possible for the current domain object and/or current domain action. If further qualification is possible, then the method comprises identifying another domain action and/or another domain object associated with the current domain object and/or current domain action, reassigning the another domain action and/or another domain object as the current domain action and/or current domain object and then recursively qualifying the new current domain action and/or current object. This process continues until nothing is left to qualify.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

To combat the spoken language understanding problems expressed above, the present invention provides a spoken language understanding module that scales well to various domains or a more generalized domain such as problem solving tasks.

Figure 1:
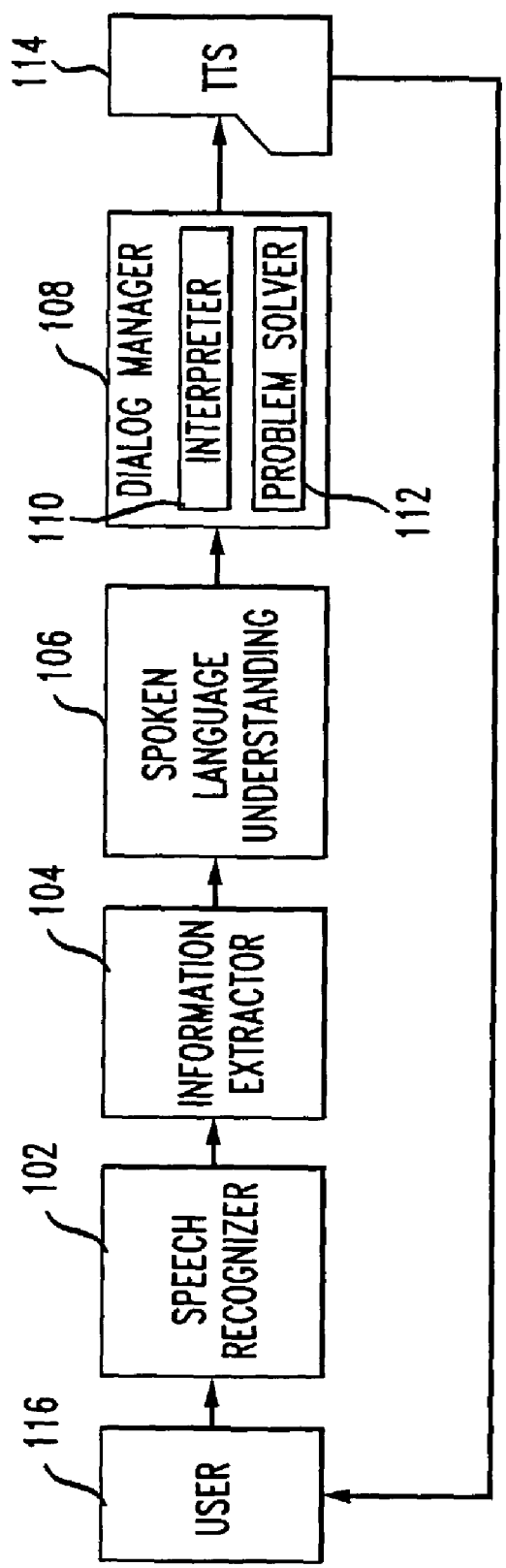
FIG. 1 illustrates an architecture of a prior art spoken dialog system.
Figure 2:
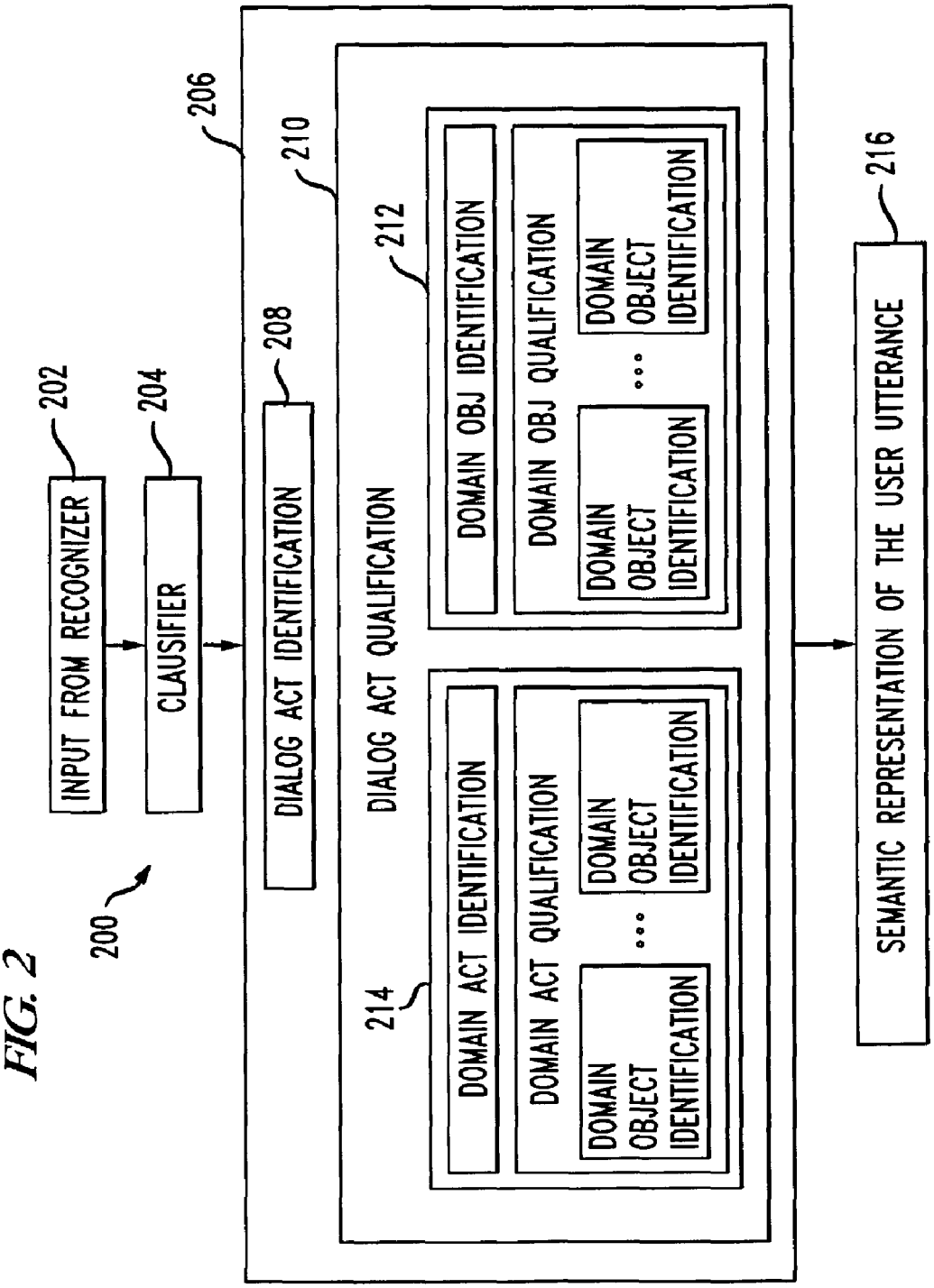
FIG. 2 illustrates an exemplary architecture for a spoken language understanding unit according to an aspect of the invention.

The method of spoken language understanding (SLU) disclosed herein overcomes many of the problems described above. This invention embodies a method of spoken language understanding in human computer dialog application developed for a domain, for example a help desk for a specific product line, a hotel reservation system etc. An exemplary architecture or module 200 is shown in FIG. 2. The method has some domain dependent and some domain independent aspects. It is hierarchical in nature and instead of using a single classifier it uses a hierarchy of feature identification modules that can be individually implemented as a classifier or by using any other technology; e.g. a syntactic parser. The domain-independent aspect involves two steps: identification of the clauses and identification of the dialog acts in the user utterances.

Text or data 202 is input to the clausifier module 204 from a previous module in the process such as a speech recognition module. A typical state of the art speech recognizer outputs continuous text, without any punctuation, for understanding the user utterance. Identification of clauses that embody a complete concept is essential. For this reason the input to the SLU is first processed by a procedure that partitions the input into clauses. In FIG. 2, this procedure is shown as being performed by the clausifier module 204. Such a clausifier module 204 can be developed, for example, by training a classifier that classifies every position in the string of words in one of 3 classes i.e. start of a new clause, end of a clause, and continue. copending application Ser. No. 10/329,138 filed Dec. 24, 2002, assigned to the assignee of the present invention, and entitled "System And Method Of Extracting Clauses For Spoken Language Understanding In Conversational Systems" describes an example system and method of extracting clauses from a string of text. This application is incorporated herein by reference.

Every clause uttered by a human is an action performed to accomplish a specific goal. Domain independent descriptions of such actions are called dialog acts (DA). Once clauses are identified, they are individually processed. As depicted in FIG. 2, at the topmost level, a clause-understanding task can be described as identifying and qualifying the dialog acts in the clause. A module 206 comprising several other modules 208, 210, 212, and 214 performs this task and as a result generates a semantic representation of each clause. The dialog act identification module 208 receives the output from the clausifier module 204 and identifies dialog acts. For example, the module 208 assigns a dialog act WANT_INFORMATION to the clauses it receives from module 204 that express desire to obtain an information. Similarly, it assigns the dialog act of REQ_ACT to the clauses asking for a specific action (such as a domain action, e.g, book a seat, cancel a reservation, etc.) to be performed.

Once DA's are identified, the module 210 performs the steps of DA qualification. This process involves determining or identifying further domain-specific information within an identified clause and is described below.

Figure 3:
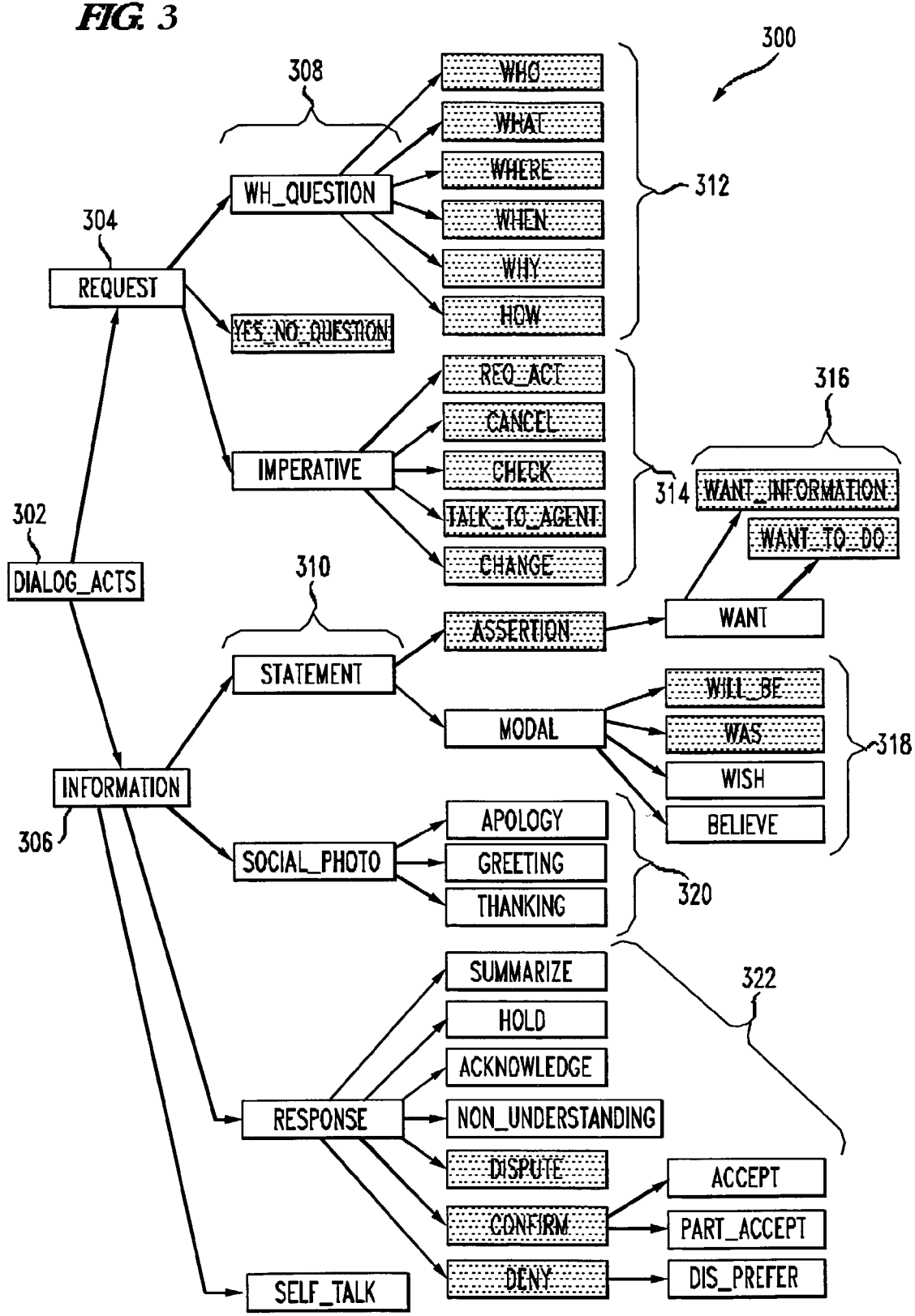
FIG. 3 illustrates a taxonomy of user-performed dialog acts in a human-machine dialog.

Before describing the dialog act qualification process, more explanation and examples of dialog acts are provided. A dialog act is a domain independent description of the action a person carries out by uttering a clause. FIG. 3 shows a taxonomical hierarchy of dialog acts 300 that people perform while interacting with machines. At the toplevel, a clause can be classified either as INFORMATION 306 (those that simply provide some information) or as REQUEST 304 (those that request for some information or some action to be done). These top-level dialog acts can be further sub-classified as shown in FIG. 3. For example, the dialog act of REQUEST 304 may be sub-classified 308 as a WH_QUESTION DA that is further sub-classified 312 as WHO, WHAT, WHERE, WHEN, WHY, HOW types of "WH" questions. Other sub-classifications are shown for a REQUEST 304 DA, such as a YES-NO-QUESTION 308 and an IMPERATIVE 308 DA. FIG. 3 further shows another layer of sub-classifications for IMPERATIVE as REQACT, CANCEL, CHECK, TALKTO-AGENT, and CHANGE 314. Of these, the DA REQ-ACT is the most general one and is assigned to the clauses embodying a request for an action to be performed. Others are special cases of REQ-ACT where the actions requested are to cancel something, check for something, transfer to an agent, and to change something, etc.

Similarly, the DA INFORMATION 306 in FIG. 3 can be further classified into STATEMENT, SOCIAL-PROTO, RESPONSE, and SELF-TALK 310. The STATEMENT DA is assigned to clauses where a person simply makes a statement, i.e., is not asking a question or requesting an action to be performed. Such statements could be either simple assertion of facts or contain some kind of modality. Accordingly STATEMENT DA can be sub-classified as ASSERTION or MODAL. The sub-hierarchy shown as 316 sub-classifies the ASSERTION DA. For example e.g. a person may make an assertion that she want to do some thing or wants to find out some things. These DA are labeled as WANT-TO-DO and WANT-INFORMATION. The sub-hierarchy shown as 318 further refines the MODAL sub-classification of STATEMENT 310, where a person may predict something for the future: WILL-BE, or the person may state something that happened in the past WAS, or the person may express a desire: WISH, or a belief: BELIEVE. The DA SOCIAL-PROTO is assigned to phrases uttered to perform some social protocol. The sub-hierarchy shown as 320 further refines the SOCIAL-PROTO 310 DA. The DA RESPONSE is assigned to phrases uttered to respond to a question. The sub-hierarchy shown as 322 further refines the RESPONSE 310 DA.

The dialog act taxonomy shown in FIG. 3 is provided for illustrative purposes only. Depending on the level of understanding one wish to build, one can add other dialog acts in this taxonomy and refine it even further, or select a restricted set of dialog acts from this taxonomy itself. For example the darkened nodes in FIG. 3 show a possible set of dialog acts that a specific dialog system may wish to identify.

Module 208 identifies the dialog acts that can be implemented by training a classifier, developing hand-crafted rules or use a combination of both.

Associating dialog acts (DA) with each clause is the first step in understanding the user utterances. However, this association alone is not enough; it needs to be further qualified. For example, the DA of WANT-INFORMATION 316 must be qualified with the description of information desired; IMPERATIVE 308 must be qualified with the action that is ordered. Obviously, while dialog acts are domain-independent, their qualification involves domain-dependent objects and actions referred to in the clause. For example, the clause "Can you tell me where Ransom is playing?" contains a dialog act of type WHERE 312 indicating to the DM that it should find out the place associated with something. The DM however also needs further qualification of the DA WHERE in that it must know the domain-dependent thing whose place it must find out. In this example, it is "playing Ransom." This step is performed by module 212 labeled as Dialog Act Qualification in FIG. 2.

Next, the dialog act qualification process—which involves domain-dependent aspects of the invention—is described. Qualifying a dialog act involves identification and qualification of domain-dependent actions and objects in the clause. An application domain comprises domain objects, some relationships between these objects and a set of actions that can be performed. Qualifying dialog acts therefore involves extracting descriptions of domain objects and domain actions referred to in the clause. This is performed by modules 212 and 214, respectively.

Like dialog acts, domain-dependent actions and domain-dependent objects are first identified and then qualified. For example, in a hotel reservation desk application if a domain action "reservation" is identified there may be additional qualifying information available in the phrase, e.g., the specification of the number of rooms, day and time of arrival, number of nights of stay and rate, etc. Similarly, in the telephone domain may require if a "telephone call" object is identified its qualifying information like international/domestic, collect/card/or normal, from phone number, to phone number, etc may also be available in the phrase.

The qualifying of a domain object or domain action is a recursive task. This can be best illustrated with the help of an example. The clause "The L.E.D on the top panel is blinking" has dialog act of INFORMATION. The domain action qualifying this dialog act is "blinking". The domain action of blinking can be qualified if possible by finding out what is blinking. In this example, it is a domain object "the L.E.D." Since L.E.D is a domain object, if possible, it must be qualified wherein its identity must be established. In this example, it is the one located on another domain object identified as panel. Once again to qualify the panel, if possible, its identity, must be established. In this example it is the top panel.

To identify and qualify the domain objects, the system must determine actions and relationships among them. A semantic representation of these must be designed. This essentially means listing all the domain actions objects and relationships that are of interest. In addition, qualifying attributes of each must also established. Finally, a data structure of this information (e.g. C++ objects, or simply attribute values) must be designed such that a computer program (the DM) is able to understand it.

A domain specific classifier or a pattern recognizer can be trained to identify domain-dependent actions and objects in a clause. Other techniques like Noun/Verb phrase identification can also be employed for this purpose. Output of these, i.e., the identified objects actions and relationships among them, are used to incrementally fill in the data structure designed for each object and actions respectively and complete semantic representation of the clause is created. This is then passed on to the DM for further action.

Typically a single classifier is used to classify the input directly in one of the limited number of actions the dialog system can take. Such techniques work well when there are small number of classes to deal with, e.g., in call routing systems. They do not scale well for tasks that require very large number of classes, e.g., problem-solving tasks. The approach described above uses a hierarchy of modules (they could be implemented as classifiers) to generate a more detailed level of description of the input than is possible by the use of a single classifier. Such detailed descriptions allow development of spoken dialog systems that have capability to solve problems as opposed to simply call routing or information retrieval.

Figure 4:
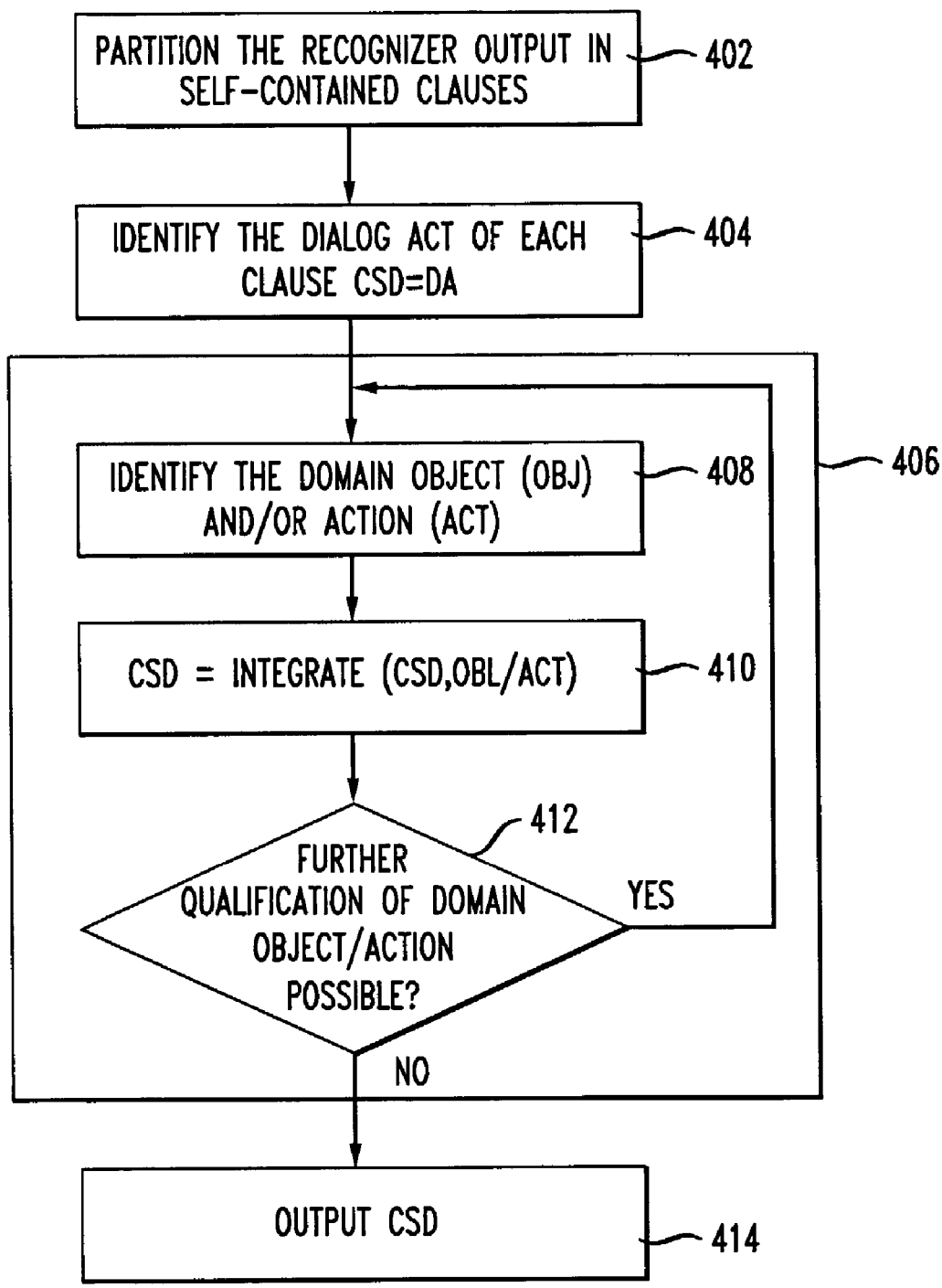
FIG. 4 illustrates an exemplary method of spoken language understanding according to an aspect of the present invention.

FIG. 4 illustrates an example method according to an aspect of the present invention. As shown in the example architecture above, the method is practiced by the SLU or similar module in a spoken dialog system. The method comprises partitioning the speech recognizer output into smaller self-contained clauses (402), identifying dialog acts in each of the self-contained clauses (404), and qualifying dialog acts (406). At each stage of the process a semantic description created so far in the process is kept around. In FIG. 4 it is represented by CSD (current semantic description). In step (404), this CSD is set equal to the identified dialog act. Qualifying the dialog act is done iteratively by identifying a current domain object and/or or current domain action (408) and extending the CSD with this information (410) and then testing if further qualification of any of the domain object or actions is possible (412). If there is no such possibility, the phrase-understanding task is completed and the current semantic description (CSD) is output (414). If it is possible to qualify some of the objects and or actions the procedure identifies the qualifying objects and actions (408) and extends the CSD with this new information. Extension of the CSD with newly found domain objects/actions (410) essentially entails in filling in the data structure designed for this purpose. This is represented as INTEGRATE (CSD, OBJ/ACT) in step (410). In this manner, an iterative loop can operate to continue to qualify identified domain objects and/or domain acts until no further qualification is possible. When no further qualification is possible, the system outputs the CSD of the input phrase which can utilized for dialog management (414).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions as set forth in the description of the invention. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, any organization of a dialog act hierarchy can apply in addition to that illustrated in FIG. 3. Accordingly, the appended claims and their legal equivalents should only define the invention, rather than any specific examples given.

We claim:

1. A method comprising:
   partitioning, via a processor, a recognizer output associated with a spoken utterance into independent clauses;
   identifying a dialog act from a hierarchical dialog act taxonomy for each of the independent clauses, wherein the hierarchical dialog act taxonomy comprises a tree structure, wherein the dialog act is a domain-independent dialog act;
   identifying at least one of an object and an action within each of the independent clauses, wherein the object is a domain-dependent object and the action is a domain-dependent action;
   qualifying the dialog act with a corresponding one of the object and the action within a respective independent clause to generate a semantic representation, wherein qualifying the dialog act comprises recursively extending the semantic representation by qualifying at least one of the domain-dependent object and the domain-dependent action in each of the independent clauses until nothing is left to qualify; and
   transmitting the semantic representation to a dialog manager for use in a dialog management application.

2. The method of claim 1, wherein the dialog manager is configured to use the semantic representation to determine a response to a user input.

3. A method comprising:
   applying, via a processor, a first domain-independent module to partition a speech recognizer output associated with a spoken utterance into independent clauses;
   applying a second domain-independent module to identify dialog acts from a hierarchical dialog act taxonomy for each of the independent clauses, wherein the hierarchical dialog act taxonomy comprises a tree structure, wherein the dialog act is a domain-independent dialog act;
   applying a first domain-dependent module to identify at least one of an object and an action within the independent clauses, wherein the object is a domain-dependent object and the action is a domain-dependent action; and
   applying a second domain-dependent module to qualify the dialog acts with a corresponding one of the object and the action within a respective independent clause, wherein qualifying the dialog act comprises recursively extending a semantic representation by qualifying at least one of the domain-dependent object and the domain-dependent action in the independent clauses until nothing is left to qualify.

4. The method of claim 3, wherein the semantic representation is used by a dialog manager in a spoken dialog system to determine a response to a user input.

5. A method comprising:
   partitioning, via a processor, a speech recognizer output into independent clauses;
   identifying a dialog act from a hierarchical dialog act taxonomy for each of the independent clauses, wherein the hierarchical dialog act taxonomy comprises a tree structure, wherein the dialog act is a domain-independent dialog act;
   identifying at least one of a current domain object and a current domain action within each of the independent clauses, wherein the current domain object is a domain-dependent object and the current domain action is a domain-dependent action;
   qualifying the dialog act with a corresponding one of the current domain object and the current domain action in a respective independent clause, wherein qualifying the dialog act comprises recursively extending a semantic representation by qualifying at least one of the domain-dependent object and the domain-dependent action in each of the independent clauses until nothing is left to qualify;
   determining whether further qualification is possible for one of the current domain object and the current domain action; and
   if further qualification is possible:
     identifying at least one of another domain action and another domain object associated with at least one of the current domain object and the current domain action;
     reassigning at least one of the another domain action and the another domain object as at least one of the current domain action and the current domain object; and
     returning to qualifying the dialog act.

6. The method of claim 5, wherein the semantic representation is used by a dialog manager in a spoken dialog system to determine a response to a user input.

7. A spoken dialog system comprising:
   a classifier that identifies, via a processor, independent clauses within the data from the speech recognizer;
   a dialog act identifier that identifies a dialog act from a hierarchical dialog act taxonomy for each of the independent clauses, wherein the hierarchical dialog act taxonomy comprises a tree structure, wherein the dialog act is a domain-independent dialog act, and wherein the object is a domain-dependent object and the action is a domain-dependent action; and
   a dialog act qualifier that identifies domain-dependent actions and domain-dependent objects in each of the independent clauses, the dialog act qualifier qualifying the dialog act with the domain-dependent actions and domain-dependent objects, wherein qualifying the dialog act comprises recursively extending a semantic representation by qualifying at least one of the domain-dependent object and the domain-dependent action in each of the independent clauses until nothing is left to qualify; and
   an output module configured to output the semantic representation.

8. The system of claim 7, wherein the semantic representation is used by a dialog manager in a spoken dialog system to determine a response to a user input.

9. A non-transitory computer-readable storage medium storing instructions which, when executed by a computing device, cause the computing device to perform a method comprising:
partitioning a recognizer output associated with a spoken utterance into independent clauses;
identifying a dialog act from a hierarchical dialog act taxonomy for each of the independent clauses, wherein the hierarchical dialog act taxonomy comprises a tree structure, wherein the dialog act is a domain-independent dialog act;
identifying at least one of an object and an action within each of the independent clauses, wherein the object is a domain-dependent object and the action is a domain-dependent action;
qualifying the dialog act with a corresponding one of the object and the action within a respective independent clause to generate a semantic representation, wherein qualifying the dialog act comprises recursively extending the semantic representation by qualifying at least one of the domain-dependent object and the domain-dependent action in each of the independent clauses until nothing is left to qualify; and
transmitting the semantic representation to a dialog manager for use in dialog management.

10. The non-transitory computer-readable storage medium of claim 9, wherein the dialog manager is configured to use the semantic representation in a spoken dialog system to determine a response to a user input.

11. A non-transitory computer-readable storage medium storing instructions which, when executed by a computing device, cause the computing device to perform a method comprising:
applying a first domain-independent module to partition a speech recognizer output associated with a spoken utterance into independent clauses;
applying a second domain-independent module to identify dialog acts from a hierarchical dialog act taxonomy for each of the independent clauses, wherein the hierarchical dialog act taxonomy comprises a tree structure, wherein the dialog act is a domain-independent dialog act;
applying a first domain-dependent module to identify at least one of an object and an action within the independent clauses, wherein the object is a domain-dependent object and the action is a domain-dependent action; and
applying a second domain-dependent module to qualify the dialog acts with a corresponding one of the object and the action within a respective independent clause, wherein applying the second domain-dependent module further qualifies the dialog acts by recursively extending a semantic representation by qualifying at least one of the domain-dependent object and the domain-dependent action in each of the independent clauses until nothing is left to qualify.

12. The non-transitory computer-readable storage medium of claim 11, wherein the semantic representation is used by a dialog manager in a spoken dialog system to determine a response to a user input.

13. A system comprising:
a processor; and
a computer-readable storage medium storing instructions which, when executed by the processor, cause the processor to perform a method comprising:
partitioning a speech recognizer output into independent clauses;
identifying a dialog act from a hierarchical dialog act taxonomy for each of the independent clauses, wherein the hierarchical dialog act taxonomy comprises a tree structure, wherein the dialog act is a domain-independent dialog act;
identifying at least one of an object and an action within each of the independent clauses, wherein the object is a domain-dependent object and the action is a domain-dependent action; and
qualifying the dialog act with a corresponding one of the object and the action within a respective independent clause to generate a semantic representation, wherein qualifying the dialog act comprises recursively extending the semantic representation by qualifying corresponding ones of the object and the action in each of the independent clauses until nothing is left to qualify.

14. The system of claim 13, wherein the semantic representation is used by a dialog manager in a spoken dialog system to determine a response to a user input.

* * * * *